Nov. 5, 1935.     W. E. CRAWFORD     2,020,276
ELECTRIC HEATING AND WELDING
Filed April 27, 1931     3 Sheets-Sheet 1
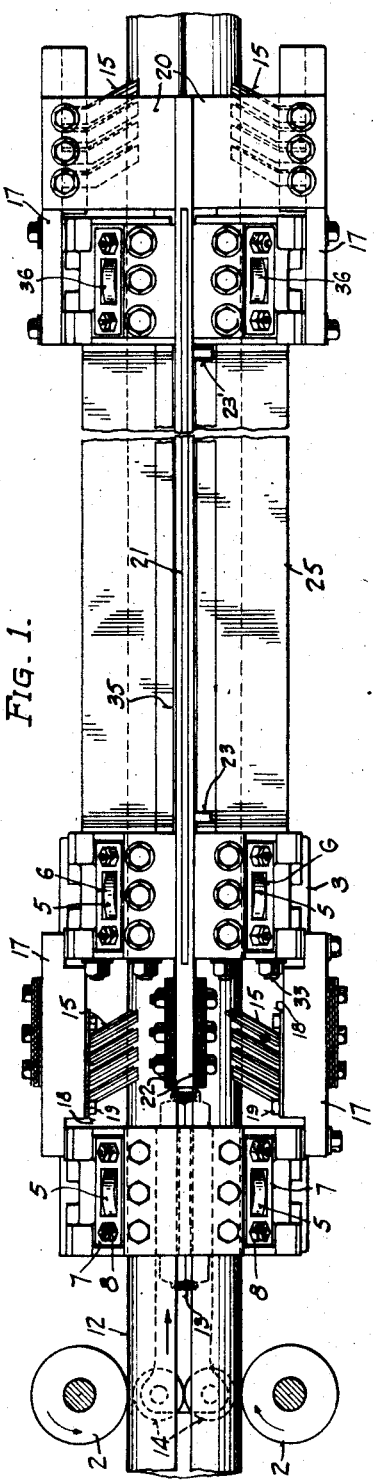
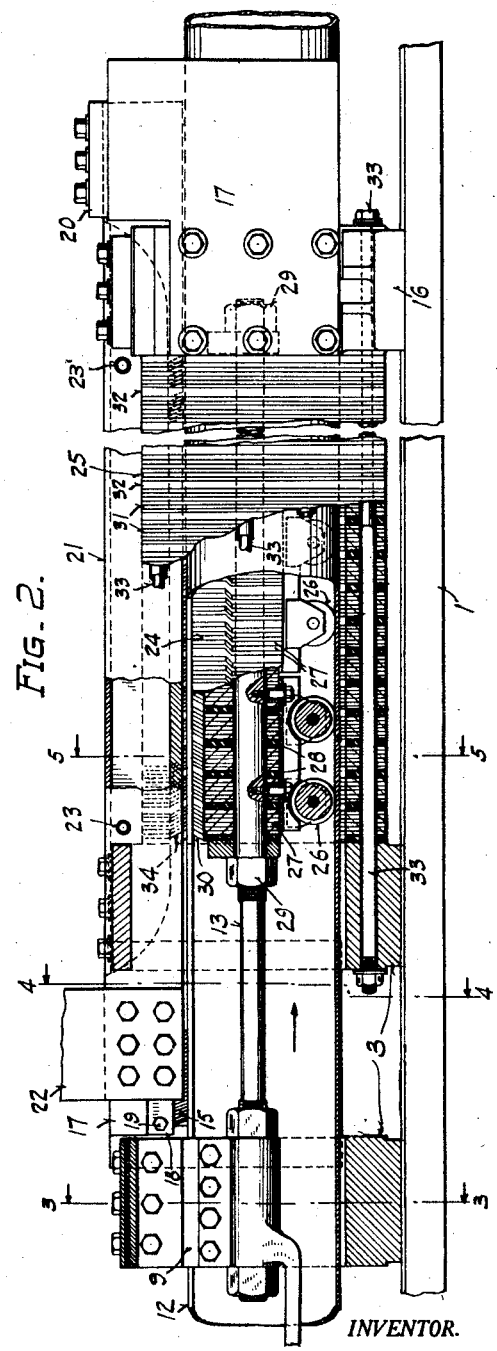
INVENTOR.
William E. Crawford
BY
ATTORNEY.

INVENTOR.
William E. Crawford
BY
ATTORNEY.

INVENTOR.
William E. Crawford
BY
ATTORNEY.

Patented Nov. 5, 1935

2,020,276

UNITED STATES PATENT OFFICE 2,020,276

ELECTRIC HEATING AND WELDING

William E. Crawford, Wauwatosa, Wis., assignor to A. O. Smith Corporation, Milwaukee, Wis., a corporation of New York Application April 27, 1931, Serial No. 533,225

18 Claims. (Cl. 219—6)

This invention relates to an apparatus and a method of welding the longitudinal seams of tubular articles, and it is among the objects of the invention to provide for passing concentrated electric currents longitudinally through those portions of the tubes which are adjacent to the seams to be welded and for heating elongated sections of tubular articles.

In accordance with the invention, a magnetic flux is looped around a longitudinal area of the article to confine the heating current therealong, and the heating current is delivered to the area between longitudinally spaced terminals. The article may desirably consist of a pipe blank having a longitudinal seam cleft. The narrow marginal areas along the seam cleft may constitute the selected area to be heated. The margins are heated to welding temperatures as the blank is advanced and then pressed together to form the seam. The pipe may be advanced and the seams may be welded continuously.

An embodiment of the invention is shown in the accompanying drawings in which

Figure 4:
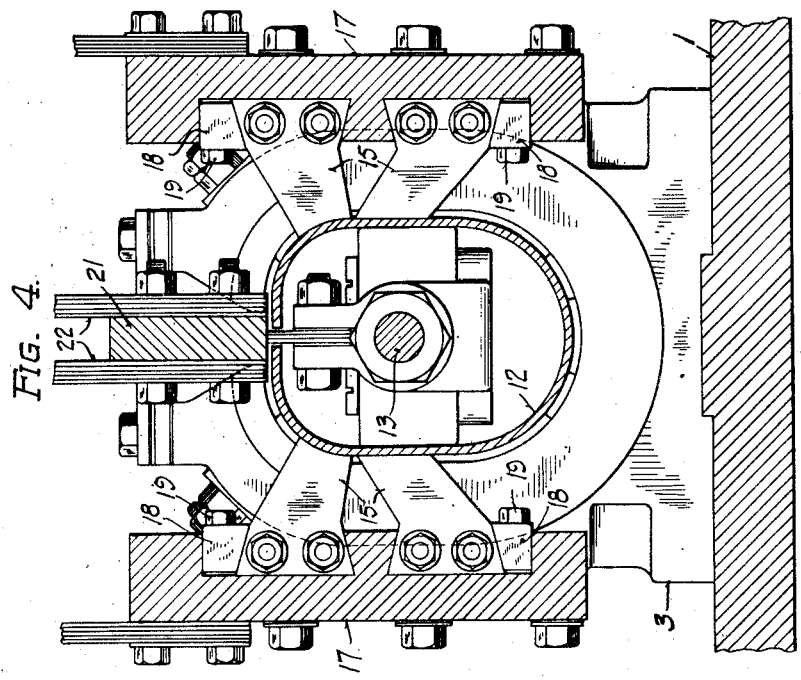
Figure 3:
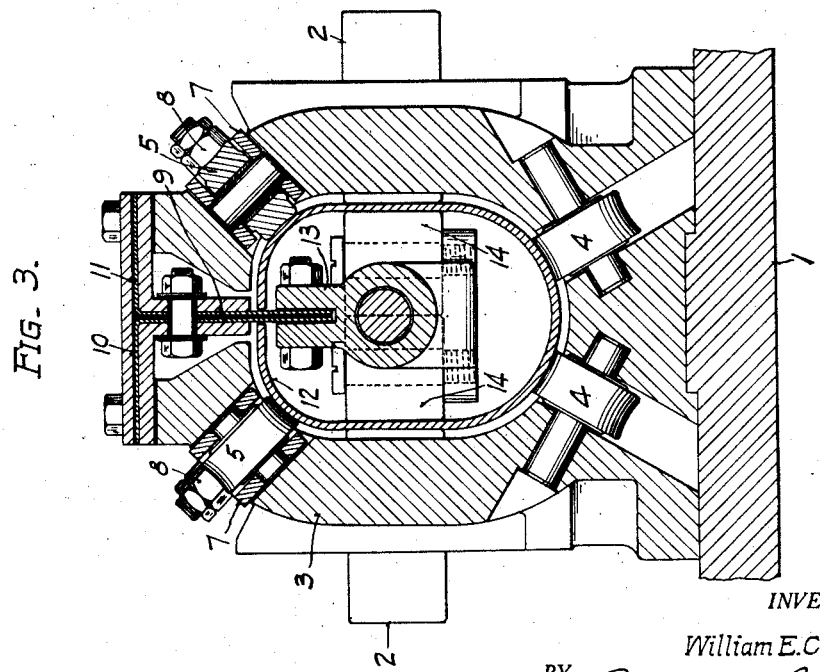
Figure 6:
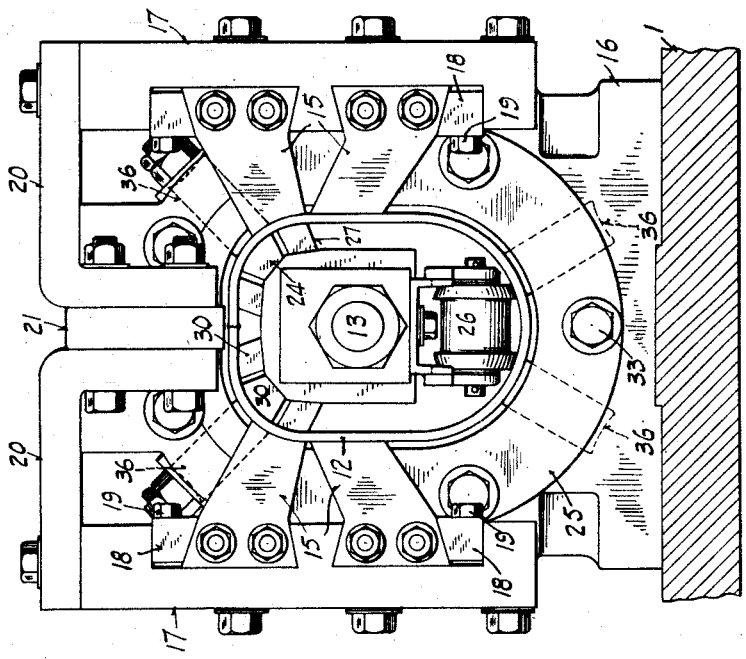
Figure 5:
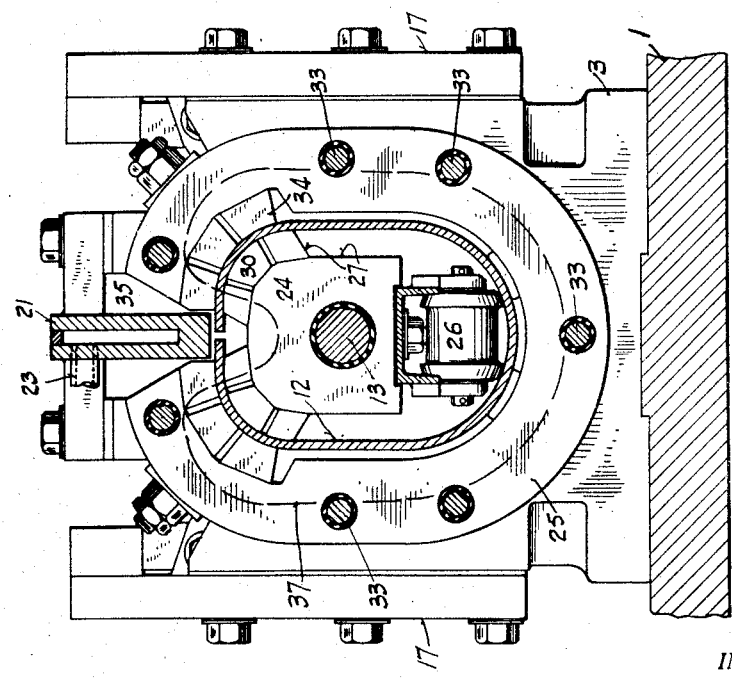

Figure 1 is a plan view of a device which is adapted to progressively weld the longitudinal seam of a tube, Fig. 2 is a side elevational view of the apparatus with parts broken away, Fig. 3 is a cross-sectional view along the line 3—3 of Fig. 2 showing the tube positioning rollers and guiding fin, Fig. 4 is a cross-sectional view taken along the line 4—4 of Fig. 2 showing one set of current contacting members for the tube and the return conductor for the current, Fig. 5 is a cross-sectional view along the line 5—5 of Fig. 2 showing the current return conductor, a laminated iron structure surrounding the tube, a laminated structure inside of the tube, and a roller support for the same, and Fig. 6 is an end elevational view of the delivery end of the apparatus showing the return conductor, a second set of current collecting members for the tube and the welding rollers.

The apparatus is mounted on the base 1 and comprises means for driving and guiding the blank through the machine, means for applying current to the blank as it is progressively passed through the machine, means for directing the flow of the current through the body of the blank to effect a concentration of flow longitudinally of the blank at or near the edges to be welded, and means for applying welding pressure to the blank.

The driving means which is shown diagrammatically in Figure 1 comprises a pair of rolls 2 on the forward end of the machine which rolls are driven so as to advance the tube endwise into the apparatus as indicated by the arrows. The rolls engage the tubular blank and propel it through the machine.

The guiding means comprises a frame 3 which is mounted on the base 1 in alignment with the rolls 2. The frame is adapted to surround the blank and it is provided at both ends with pairs of lower guide rolls 4 and pairs of upper adjustable guide rolls 5 for engaging the tubular blank and guiding it through the machine. The lower guide rolls 4 are journaled in the frame and they support the blank during its movement through the machine. The upper guide rolls 5 are mounted in adjustable blocks 7 which are mounted in inclined slots in the frame. The rolls 5 are adjustable radially of the blank by moving the block 7 in the slots and they are secured in the adjusted position by means of the locked nuts 8 which secure the blocks 7 to the frame 3. This adjustment regulates the pressure of the rolls against the tube blank.

As shown in Fig. 3, a fin 9 is mounted to extend downwardly between the forward rolls 5. The fin 9 comprises two angle plates 10 and 11 which are insulated from one another by a strip of insulating material and held together by bolts. The fin 9 extends downwardly through the spaced edges of the entering blank 12. The fin is mounted by bolting the outwardly extending arms of the angle irons to the top of the frame.

As shown in Fig. 1, the fin 9 supports a mandrel 13 extending inside the blank for substantially the full length of the machine. The forward end of the mandrel is provided with rolls 14 which are opposed to the drive rolls 2 and are adapted to support the blank from within against the radial pressure imposed upon it by the drive rolls 2.

The fin 9 guides the blank through the machine and accurately positions the edges for welding. The fin 9 is electrically insulated from the frame and mandrel as shown in Fig. 3.

The means for applying heating current to the blank comprises two sets of electrodes 15 spaced longitudinally of the blank and adapted to apply alternating current to the side walls of the blank, the current flowing longitudinally through the blank from one set of electrodes to the other.

One set of electrodes is carried by the frame 3 between the forward and rear sets of guide rolls. The other set of electrodes is carried by the rear of the frame 16 which is mounted on base 1.

The electrodes 15 consist of a plurality of brushes bolted together and secured to conducting plates 17 by gib blocks 18 and cap screws 19. The conducting plates 17 are secured to the sides of frames 3 and 16, respectively, and are insulated therefrom.

The rear conducting plates 17 are connected by means of angle bars 20 to a tubular return conducting bar 21 which extends forwardly along the blank just above the seam. At its forward end the return bar 21 is connected by flexible leads 22 to one terminal of a secondary of the welding transformer (not shown) while the forward conducting plates 17 are connected by similar leads to the other terminal of the transformer secondary.

Pipes 23 and 23' communicate with the interior of the conducting bar 21 at opposite ends thereof to supply cooling medium such as water thereto.

The means for directing the flow of the heating current through the body of the blank to effect a concentration of flow longitudinally of the blank at or near the edges to be welded comprises an internal magnetic core member 24 and an external magnetic core member 25.

The core member 24 is mounted on the rear end of the mandrel 13 and is supported within the pipe by means of rollers 26. The member 24 comprises a plurality of laminations or discs 27 assembled side by side in groups. The laminations are composed of transformer iron and are separated from each other by insulating varnish. The groups are insulated from each other by the insulating discs 28.

The laminations are insulated from the mandrel 13 and secured thereon by means of a pair of clamping nuts 29. The insulation and varnish serve to isolate the laminations from the supporting rollers 26 but they may be isolated in any suitable manner. The upper edge portions 30 of the laminations are preferably bent at an angle so that they may be held firmly in brushing contact with the interior surface of the tube blank by the supporting rollers 26 as the tube blank is advanced longitudinally.

The outer magnetic member 25 constitutes an assembly of transformer iron laminations 31 separated by insulating varnish and having groups separated by insulating discs 32. The laminations 31 extend circumferentially of the pipe and are held together by longitudinally extending bolts 33 passing therethrough and insulated therefrom. The bolts 33 also pass through frame members 3 and 16 and thereby secure the outer core member 25 between said frame members.

These laminations 31 have contacting edge portions 34 adjacent the seam and bent in the direction of travel of the blank to contact with the top outer surface of the blank as shown in Figs. 2 and 5. The laminations 31 do not extend entirely around the circumference of the blank, but are cut to provide a gap 35 above the edges which are to be heated. The return bar 21 is disposed in the gap formed at the ends of laminations 31.

The assembled core members 24 and 25 form a structure which extends longitudinally of the blank for the entire distance between the end frames and are in the same region as the longitudinal flow of current in the blank.

The means for applying the welding pressure to the blank consists of a set of rolls 36 similar to rolls 4 and 5, and mounted in the frame 16 just ahead of the electrodes 15. The upper pair of rolls 36 are adjusted to give the required welding pressure while the lower pair of rolls in the set support the blank from distortion. The welding rolls may be set at any angle and may be larger than those illustrated or a welding bell may be used instead. The specific mechanism employed is not important, the only requirement being that the required coalescence of the heated edges is obtained by the pressure applied.

In the operation of the machine, assuming that a blank 12 is being driven therethrough and that the alternating heating current is being applied, it is found that where the current tends to flow longitudinally in the tube portion lying between the inside and outside laminated members 24 and 25, a redistribution of the current is obtained, causing its major portion to follow a path along the edge portions of the blank adjacent the seam to be welded, thereby effecting economy of the current required and at the same time maintaining the mechanical strength of the remainder of the tube walls to facilitate the application of welding pressure to the blank.

Any tendency of the current to flow longitudinally through the walls of the blank at portions distant from the edges produces a magnetic flux in the laminations of members 24 and 25 illustrated by the broken line 37 in Fig. 5. The path of the magnetic flux through the laminations is of such area as to require only a small current flowing within it to produce the required opposing voltage great enough to prevent any greater current from flowing through the portions distant from the edges. Thus the major portion of the current is compelled to follow the edge portions of the blank which is the only part of the tube not surrounded by the magnetic flux.

The edge portions of the blank are heated to welding temperature progressively as the blank is driven through the machine and the welding rolls then apply pressure to the blank causing a coalescence and welding of the heated edge portions, while the remainder of the blank is comparatively unheated and of substantial strength for transmitting the welding pressure to the heated edges.

The spacing of the edges as they enter the machine and pass the fin facilitates the final upsetting of the heated edge portions in the welding rolls.

It is preferable to employ a continuous tube which may be formed of lengths of skelp welded end to end since the heating current flows longitudinally of the blank and an interruption in the tube may cause non-uniform heating at the ends and consequent failure to weld. Where transverse welds are employed to supply a continuous tube blank the weld should be cooled prior to its entrance in the present machine in order to insure uniform heating of the longitudinal edge portion.

It is also preferable to employ a blank of somewhat rectangular non-circular cross section, thereby facilitating the positioning of the blank and the application of the welding pressures thereto.

This method of heating is of advantage since any two juxtaposed points on opposite edges will be of the same potential at any instant and the upsetting and welding pressure may be applied without the difficulties otherwise obtained in contacting opposed edge portions having a potential difference therebetween. The uniform heating is obtained irrespective of the relative position of the edges and there are no overheated and underheated regions along the seam.

The closeness of the electric return conductor 21 to the edge portions provides a welding circuit of low reactance loss by limiting the magnetic flux path in the circuit.

The closeness of the alternating current return conductor 21 to the current carrying tube 12 assists in confining a major portion of the longitudinally flowing heating current in the tube to the marginal edge portions of the tube adjacent the seam or to the longitudinally extending element of the tube nearest the return conductor 21.

The above confining or redistribution of heating current in the tubular article due to the position of the return conductor is because of the fact that the close proximity of the return conductor to the tube, which is also a conductor for the alternating heating current, provides a magnetic path, between these current conductors, of relatively high reluctance for the flux produced by the longitudinally flowing current in these conductors.

The above magnetic flux surrounds the currents producing them and tends to pass through the loop formed between the tube 12 and the return conductor 21, but due to the relatively high reluctance of this magnetic path between these conductors, a portion of the flux passes through the conductor around which it is passing instead of passing between the conductors. Thus a part of the magnetic flux resulting from the longitudinally flowing currents in each conductor passes around only a longitudinal element of the conductor lying in a position removed from the space between the conductors. This portion of the flux surrounds or links with only the current flowing through this remote element of the conductor.

From the above it is evident that the longitudinally flowing currents in the conductor elements adjacent the space between the conductors has less total flux surrounding or linking with it, than does the current flowing through the conductor elements remote from said space. The latter currents are thus subjected to more self-inductive action and have a greater induced electromotive force opposing their flow. Due to the inequality of these opposing induced electromotive forces the heavier heating currents flow in the conductor elements adjacent the space between the conductors.

The above described phenomena effecting a redistribution of the alternating current in looped or parallel conductors is dependent upon the frequency of the current and the magnetic permeability of the conductor, the redistribution of current being greater the higher the frequency and the greater the permeability.

In the present case the current density in the tube being heated is made greater in the portion of the tube lying nearest the return conductor.

With the return conductor 21 in the position shown in the drawings and described above, the employment of the magnetically permeable core member 24 inside the tube facilitates the above described concentration of current in the tube element adjacent return conductor 21 by providing a magnetically permeable path around said element inducing a greater flux to link with the remainder and remote part of the tube only, thereby greatly limiting the flow of current through that portion of the tube.

The outer permeable member 25 further assists in increasing the flux linkage with the outer portion of the tube thus further restricting the current flow through said tube portion.

The above magnetic members 24 and 25 function in the above described manner to limit the current flow through the longitudinal elements of the tube 18 remote from the position of the conductor loop whether the return conductor 21 is close to or remote from the tube. However, as above described, the closeness of conductor 21 to tube 18 increases the concentration of heating current in the tube element adjacent it.

I claim:

1. An apparatus for progressively welding a longitudinal seam in a tubular article, comprising means for progressively advancing the tube, means for passing alternating electric heating current longitudinally through said article, a magnetic member within said article in the region of said current flow arranged to receive a magnetic flux from the tube wall adjacent one side of the longitudinal seam to be welded and pass it to the tube wall on the other side of such seam, a return conductor for the heating current arranged parallel and closely adjacent said longitudinal seam, and means to exert pressure on the seam to weld the same when heated to a welding temperature by said current in said tubular article.

2. A device for heating a selected elongated longitudinally extending area of a tubular article which comprises means adapted to supply alternating heating current longitudinally through the area, a magnetically permeable structure extending around that portion of the tubular article starting from one side of the selected area and ending at the other side of the selected area, and an additional magnetically permeable structure on the inside of said article arranged to cooperate with said first-named structure bridging the start and finish ends thereof and thereby looping the flux carried by said first-named structure around the selected area to effect the confinement of the heating current to said selected area, said magnetically permeable structures being arranged at their opposing ends to contact with the article along the longitudinal margins of the area to pass the magnetic flux therethrough.

3. A device for use in welding a longitudinal seam in a tubular blank which comprises means to deliver alternating heating current longitudinally through the blank, part of said means comprising a return conductor for the current arranged parallel and in proximity to the same, and magnetically permeable means cooperative with the current-delivering means for the production of magnetic flux and the conduction of the same through the blank and to loop the metal along the seam to confine the heating current therealong.

4. A device for welding the margins of a seam cleft in a metal blank which comprises means for advancing the margins, means for delivering alternating heating current to the margins, a heating current conductor disposed near and parallel with said margins, means cooperative with the heating current conductor for setting up a magnetic field which passes through the blank and loops the marginal metal to confine the current along the margins, and means for bringing the margins into welding engagement when they are heated to welding temperatures.

5. A device for welding the margins of a longitudinal seam cleft in a tube blank which comprises means for continuously advancing the blank longitudinally, means for delivering alternating heating current along the blank, magnetically permeable means to carry flux produced by the current flowing longitudinally through the tube and to pass the flux through the blank and loop it around the marginal metal to confine the current therealong, and means for bringing the margins continuously into welding engagement when they are heated to welding temperature.

6. A device for welding together the longitudinal margins of a tube blank which comprises contact terminals spaced longitudinally with respect to the blank for delivering alternating heating current therealong, a plurality of magnetic members passing around the blank and terminating at the sides of the marginal areas, an elongated core disposed in the tubular enclosure, an alternating current conductor disposed above and longitudinally of the margins in the space between the ends of the magnetic members cooperative with the magnetic members to confine the heating current along the margins.

7. A device for welding together the longitudinal margins of a tube blank which comprises contact terminals spaced longitudinally with respect to the blank for delivering alternating heating current therealong, a plurality of magnetic members passing around the blank and terminating in contact members which are disposed to contact with the blank along the marginal areas, an elongated core disposed in the tubular enclosure having extensions opposed to said contact members, and a current conductor in close proximity to the margins for confining the heating current to the marginal areas and the magnetic field to the magnetic members and core.

8. The method of heating a selected area of an electrically conductive article which comprises passing alternating heating current longitudinally through the article, passing magnetic flux around the article, and deflecting the flux away from said area to loop the flux therearound and confine the heating current to the area.

9. The method of forming a longitudinal seam in a tubular electrically conductive article which comprises passing alternating heating current longitudinally through the article, confining the current to the margins of the seam cleft by placing a magnetically permeable flux-carrying path around the article and deflecting the flux carried thereby away from the margins, continuing the flow of the heating current to heat the margins to welding temperatures, and uniting the margins by pressure.

10. The method of progressively welding a longitudinal seam in a tubular article which comprises passing an alternating electric current longitudinally through the article, moving the article longitudinally with respect to the seam, providing a magnetically permeable member to conduct flux transversely around those longitudinally extending portions of the article transversely remote from the seam to confine the major portion of the alternating current passing through the article to the marginal metal of the seam cleft to raise the marginal metal to welding temperature, conducting said current in an opposite direction but parallel to and closely adjacent said margins, and applying pressure to bring the margins together in welding contact when the margins are heated to welding temperature.

11. A device for heating a longitudinal portion of a tubular article which comprises connections to a source of alternating current, contact members longitudinally spaced across said portion in circuit with the terminals of said source, a current return conductor in the circuit disposed near and extending along the portion to be heated, and magnetic members cooperating with said conductor to concentrate the current in the portion to be heated.

12. A device for progressively welding the spaced longitudinal edge portions of a tubular blank which comprises terminal alternating current conducting members in contact with the blank, said members being spaced apart longitudinally of the blank, a current conductor spaced from and along said edge portions and in circuit with said terminal members, a plurality of magnetic members cooperative with said current conductor to produce a magnetic field around the blank between the terminal members, said magnetic members being disposed and arranged to conduct the field around the edge portions of the blank to concentrate the heating current therealong, means for advancing the blank to bring the edge portions progressively in circuit with said terminals, and means to contact the edges of the blank and apply welding pressure progressively as the edge portions are heated to welding temperature.

13. A device for welding the spaced longitudinal edge portions of a tubular blank which comprises means for passing parallel alternating heating currents longitudinally through the blank, a magnetic member disposed in the enclosure of said blank having contacts to conduct magnetic flux from one side of one edge portion to the other side of the other edge portion thereby to loop magnetic flux transversely around the portions to be welded and to concentrate the heating currents therealong, means to progressively advance the spaced edge portions longitudinally of the blank while said portions are being heated to welding temperature, and means to bring the edge portions together and apply welding pressure progressively as the portions are heated to welding temperature.

14. A device for heating a longitudinal portion of a tubular article which comprises current conducting members in circuit with an alternate alternating current supply and in contact with the article at the ends of said portion, a return conductor in circuit with said current conducting members disposed parallel to said portion and closely adjacent thereto, a magnetizable member around the article having terminals on the article at the sides of the return conductor, and a magnetizable core within the tubular article for conducting flux between the terminals of the magnetizable member.

15. A device for welding the spaced longitudinal edge portions of a tubular blank which comprises means for passing alternating heating current longitudinally through the blank, a plurality of permeable members passing around external portions of the blank, said members being insulated from each other and having end terminals along the sides of said edge portions, a plurality of permeable core members insulated from each other disposed in the enclosure of said blank and having contact terminals opposed to said end terminals, and a heating current conductor disposed in the space between said end terminals.

16. A device for welding the spaced longitudinal edge portions of a tubular blank which comprises means for passing alternating heating current longitudinally through the blank, a plurality of permeable members passing around external portions of the blank, said members being insulated from each other and having end terminals along the sides of said edge portions, a plurality of permeable core members insulated from each other disposed in the enclosure of said blank and having contact terminals opposed to said end terminals, a heating current conductor disposed in the space between said end terminals, means for retaining said edge portions parallel with said current conductor while they are being heated to welding temperature, and means for bringing the heated edge portions into welding engagement.

17. A device for heating a longitudinal portion of a metallic article comprising, a source of varying current, connection from one terminal of said source to one extremity of the portion to be heated, a conductor disposed near and extending in parallelism with the portion to be heated and the end of said conductor adjacent to the other extremity of said portion being connected thereto and means connecting the free end of said conductor to the other terminal of the current source.

18. A method of electrically heating a narrow, strip portion of a current conducting body comprising passing a varying current through said body between end points of the portion to be heated, positioning a conductor in close proximity and in parallelism to said strip portion and passing a similarly varying current through said conductor in a direction opposite to said body current whereby the heating current in the body is confined to heat the narrow strip in proximity to said conductor.

WILLIAM E. CRAWFORD.